United States Patent [19]

Kaetsu et al.

[11] 4,138,538
[45] Feb. 6, 1979

[54] PROCESS FOR PRODUCING A TRANSPARENT SHAPED POLYMERIC PRODUCT

[75] Inventors: Isao Kaetsu; Hiroshi Okubo; Fumio Yoshii, all of Takasaki, Japan

[73] Assignee: Japan Atomic Energy Research Institute, Tokyo, Japan

[21] Appl. No.: 670,169

[22] Filed: Mar. 24, 1976

[30] Foreign Application Priority Data

Mar. 26, 1975 [JP] Japan .................................. 50-35374

[51] Int. Cl.$^2$ ........................ C08F 2/54; C08F 236/20
[52] U.S. Cl. ................................ 526/73; 204/159.23; 204/159.22; 526/218; 526/230; 526/232; 526/273; 526/320; 526/328; 526/333; 526/334
[58] Field of Search ...................... 204/159.22, 159.23; 526/73, 334, 273

[56] References Cited

U.S. PATENT DOCUMENTS

| | | | |
|---|---|---|---|
| 2,480,751 | 8/1949 | Marks | 204/159.22 |
| 3,221,083 | 11/1965 | Crandon | 264/1 |
| 3,787,378 | 1/1974 | Blank | 204/159.22 X |
| 3,872,042 | 3/1975 | Bond | 264/1 X |
| 3,880,818 | 4/1975 | Shen et al. | 204/159.23 X |
| 3,944,637 | 3/1976 | Bond et al. | 264/1 |
| 3,955,015 | 5/1976 | Ohtsuka et al. | 427/163 |
| 3,983,083 | 9/1976 | Kaetsu et al. | 526/240 |
| 4,010,088 | 3/1977 | Okubo et al. | 204/159.24 |

Primary Examiner—Wilbert J. Briggs, Sr.
Attorney, Agent, or Firm—Browdy and Neimark

[57] ABSTRACT

This invention provides a process for preparing a transparent polymeric product free from strain and bubbles and having improved physical and chemical properties. The product can be produced from a bis-allylcarbonate-based monomer mixture by cast polymerization for extremely shortened polymerization time.

10 Claims, No Drawings

PROCESS FOR PRODUCING A TRANSPARENT SHAPED POLYMERIC PRODUCT

BACKGROUND OF THE INVENTION

This invention relates to a process for preparing a transparent polymeric product free from strain and bubbles and having improved properties.

It is well known that transparent plastics are being substituted for inorganic glass in certain fields of application due to their light weight, improved workability and impact resistance. Further, in certain other fields of application, such plastics have become popular because of unavailability of other suitable materials.

However, only a few transparent plastics are known which are improved in the various properties such as mechanical strength, transparency, weather resistance and the like and have good appearance required for general-purpose plastics. One class of transparent plastics which is commercially used is acrylic resin, particularly polymethylmethacrylate, because it has a relatively high rating in the various properties stated above.

In general, one of the serious defects of plastics is low wear property and surface hardness; the surface thereof is easily scratched in comparison with inorganic glass. Another defect of the plastics is that they are inferior to inorganic glass in heat and chemical resistance. The polymethylmethacrylate with the properties stated above is not perfectly satisfactory.

Recently, a polymer of diethyleneglycol-bis-allylcarbonate represented by the formula

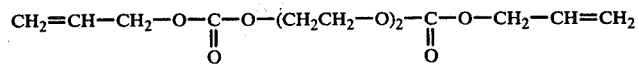

has been developed. This is a transparent plastic having highly improved wear property and resistance to heat, impact, and the like. However, although the polymer of diethyleneglycol-bis-allylcarbonate has the above excellent physical and chemical properties, it can not be shaped by molding because of its high heat resistance. Therefore, to obtain a satisfactory polymeric product the monomer must be cast polymerized. However, in order to carry out the cast polymerization effectively the polymerization time must be shortened (i.e. the polymerization rate must be increased) and this creates problems in that strain, optical anisotropy and high residual stress in the product give the product defects such as lowering of optical properties and mechanical strength.

Further, it is also a serious problem that the polymeric product usually has bubbles which are formed by the vaporization or decomposition of the monomer or by expansion of entrained air due to the local temperature increase based on accumulation of heat generated during polymerization. In order to avoid such defects, the cast polymerization should be carried out by initially heating the monomer at a relatively low temperature of from 40 to 50° C. and the gradually elevating it over several to a dozen or so hours to complete the polymerization. Therefore, one cast polymerization run normally takes about 24–40 hours to produce a product about 0.5 cm thick and about several tens to several hundreds of hours for a product having a thickness above about 0.5 cm. Such low efficiency in cast polymerization checks the application of the product for general-purpose plastics although a plastic such as a polymer of diethyleneglycol-bis-allylcarbonate has improved physical properties.

SUMMARY OF THE INVENTION

One object of this invention is to provide a polymerization method by which a polymeric cast product with physical properties at least equivalent to those of a polymer of diethyleneglycol-bis-allylcarbonate or its analogue and to provide a composition useful for the method.

Other objects of this invention will be apparent from the following description of the specification.

The inventors have found a composition useful in the preparation of a cast polymeric product free from strain or bubbles by an economical method which takes less time than the conventional one, the polymeric product having improved various physical properties such as resistance to heat and chemicals, surface hardness, wear property, mechanical strength such as impact strength, and the like equivalent to or superior to those of a polymer of diethyleneglycol-bis-allylcarbonate.

DESCRIPTION OF THE PREFERRED EMBODIMENTS

A method according to this invention comprises mixing one or more components each of (A) and (B) as defined below and a catalyst (C), pouring the mixture into a cell or mold having a desired shape for cast polymerization, initiating the polymerization at a temperature at highest 30° C. by the irradiation of light or ionizing radiation. Examples of components (A) and (B) which are suitable for use in this invention are: (A) one or more monomers represented by the formula

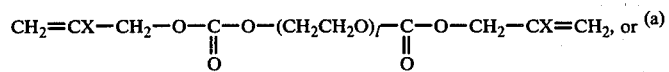

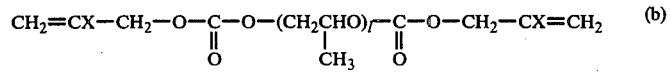

wherein X is H or CH$_3$ and l is an integer of from 1 l to 4, or its prepolymer, more particularly,
ethyleneglycol-bis-allylcarbonate,
ethyleneglycol-bis-methallylcarbonate,
diethyleneglycol-bis-allylcarbonate,
diethyleneglycol-bis-methallylcarbonate,
triethyleneglycol-bis-allylcarbonate,
triethyleneglycol-bis-methallylcarbonate,
tetraethyleneglycol-bis-allylcarbonate,
tetraethyleneglycol-bis-methallylcarbonate,
propyleneglycol-bis-allylcarbonate,
propyleneglycol-bis-methallylcarbonate,
dipropyleneglycol-bis-allylcarbonate,
dipropyleneglycol-bis-methallylcarbonate, tripropyleneglycol-bis-allylcarbonate,
tripropyleneglycol-bis-methallylcarbonate,
tetrapropyleneglycol-bis-allylcarbonate and tetrapropyleneglycol-bis-methallylcarbonate; and (B) one or more monomers represented by the formulae

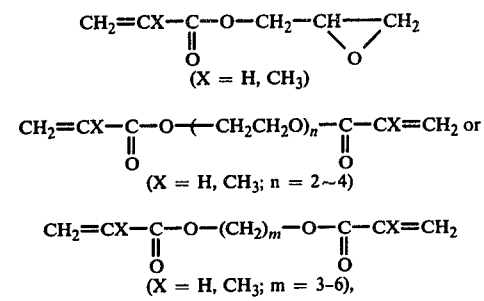

$$CH_2=CX-C-O-(CH_2)_m-O-C-CX=CH_2 \quad (e)$$
$$\phantom{CH_2=CX-}\|\phantom{-O-(CH_2)_m-O-}\|$$
$$\phantom{CH_2=CX-}O\phantom{-O-(CH_2)_m-O-}O$$
(X = H, CH$_3$; m = 3–6), more specifically, glycidyl acrylate, glycidyl methacrylate, diethyleneglycol diacrylate, diethyleneglycol dimethacrylate, tetraethyleneglycol diacrylate, tetraethyleneglycol dimethacrylate, butyleneglycol dimethacrylate, propyleneglycol dimethacrylate, pentanediol diacrylate, pentanediol dimethacrylate, hexanediol dimethacrylate, triethyleneglycol diacrylate and triethyleneglycol dimethacrylate. Among the components (A), the compounds represented by the formula (a) wherein l is 1, 2, or 3, preferably 2 are more advantageously used in this invention. Similarly, the compounds (B) represented by the formula (d) are especially preferred.

The catalyst (C) which is useful in this invention includes any radical catalysts capable of initiating the radical polymerization of a polymerizable monomer. Typical catalysts are peroxides such as benzoylperoxide, terbutylhydroperoxide-azobisisobutyronitrile, diisopropylperoxydicarbonate and the like; hydroperoxides; dinitriles and the like or redox catalyst systems comprising the catalyst above and an electron donor such as aniline, and preferably, peroxides such as benzoylperoxide, diisopropylperoxydicarbonate and the like.

The composition according to this invention comprises preferably 30–80% by weight of component (A) and 70–20% by weight of component (B). The catalyst may be present in an amount of from 0.5 to 5 parts by weight per 1,000 parts of the total amount of monomers.

All of the monomers (A) represented by the formulae above wherein l is an integer of 4 or less are comparable to ethyleneglycol-bis-allylcarbonate in their polymerizability.

As the integer each of n and m in the formulae above gets larger, the polymer prepared from such monomer (B) becomes softer and therefore, n and m are limited as disclosed above. The monomer (B) provides a copolymer having properties equivalent to or superior to those of a polymer of diethyleneglycol-bis-allylcarbonate by mixing it with diethyleneglycol-bis-allylcarbonate and subjecting the resulting mixture to copolymerization. Further, the mixture has a reactivity sufficient to be polymerized at a temperature below room temperature with the irradiation of a light or an ionizing radiation, and especially, it takes a supercooled state to have a high viscosity unless it crystallizes to lose its reactivity when cooling it to a relatively low temperature whereby the rate of polymerization is extremely increased to realize efficient polymerization.

The mixture according to this invention exhibits special behavior at a temperature so low that the viscosity is high enough to reduce the molecular motion of the polymer produced; the change (decrease) in volume is low during polymerization and the temperature of the mixture is not raised to an undesirable level substantially eliminating the expansion of entrained air and vaporization of monomer to produce bubbles even if heat is generated during the polymerization. Therefore, a cast polymeric product free from defects such as bubbles and strain can be efficiently prepared at a high rate of polymerization from the mixture according to this invention.

As is known, the monomer (A) alone can not be polymerized even by the irradiation of light or ionizing radiation. Further, the monomer (A) alone can not be cooled to a supercooled state because crystallization occurs around −30° C. If there is a catalyst capable of polymerizing the monomer at such low temperature, the polymerization would not be efficiently carried out because the rate of polymerization would be too low.

For the reasons stated above, the mixing of the monomer (B) with the monomer (A) results in considerably improved properties suitable for cast polymerization, because the mixture can take a supercooled state which is suitable for efficient copolymerization, and can be polymerized by irradiating with light or ionizing radiation.

If the content of the monomer (A) is lower than 30% by weight, it is impossible to provide the product with properties equivalent to or superior to those of the homopolymer of the monomer (A). On the other hand, when the content of the monomer (A) is more than 80% by weight, the cast polymerizability of the mixed monomers is lowered and this decrease in polymerizability makes it difficult to produce efficiently a product free from defects.

According to this invention, a monomer (D) may be incorporated in the polymeric mixture in addition to the monomers (A) and (B) in an amount less than 66.8% by weight based on the total amount of the monomers (A) and (B) and less than 40% by weight based on the total amount of the mixture, although the amount varies depending on the specific property or properties to be improved such as weather resistance, acid resistance, water resistance, flame retardancy, adhesiveness, machinability, refractive index, Abbe's number or the like.

The monomers which may be used as the monomer (D) according to this invention include, for example, styrene; methacrylic acid esters such as methyl methacrylate, ethyl methacrylate, butyl methacrylate, propyl methacrylate, lauryl methacrylate, cyclohexyl methacrylate, 2-ethylbenzyl methacrylate, benzyl methacrylate, stearyl methacrylate, allyl methacrylate, hydroxyethyl methacrylate, polyethyleneglycol methacrylate, phenyl methacrylate, hexanediol methacrylate, butanediol methacrylate, 2-ethylaminoethyl methacrylate, acetoxyethyl methacrylate and the like; acrylic acid esters corresponding to the methacrylates enumerated above; vinyl triene; α-methylstyrene; methacrylic acid; acrylic acid; acrylonitrile; methacrylonitrile; trimethylolethane trimethacrylate; trimethylolethane triacrylate; acrylamide; methacrylamide; divinylbenzene; maleic anhydride; triallyl cyanurate; trimethylolpropane trimethacrylate; trimethylolpropane triacrylate; itaconic acid; crotonic acid; triallyl cyanurate; diallyl phthalate;

tribromomethacryloxy phosphate; monobromomethacryloxy phosphate; dibromomethacryloxy phosphate; vinyl acetate; vinyl propionate; vinyl butylate; vinyl stearate and the like. Lower alkyl acrylates or methacrylates are especially preferable as the component (D) of this invention.

One or more monomers (D) above may be incorporated in the polymerizable mixture according to this invention in an amount up to 40% by weight based on the total amount of the monomers whereby various properties of the object copolymer are improved. Therefore, the addition of the monomer (D) is included in the scope of this invention. In such case, the advantages to be obtained by mixing the monomers (A) and (B) are not essentially reduced provided that the monomer (D) is used in an amount in the range specified above.

According to this invention, each of the monomers (A), (B) and (D) may be used as a prepolymer thereof.

According to this invention, the mixture of (A), (B) and (C) or (A), (B), (C) and (D) is copolymerized for at longest several hours usually for one hour or less to obtain a desired cast product by increasing the intensity of light or the dose rate of radiation, depending on the polymerization temperature and the size of the object product.

Thus, it is understood that the polymerization time is shorter than the 24 hours or longer of the prior art.

It should be noted that if the polymerization rate becomes too low the polymerization terminates, because the glass transition point of the mixture is elevated as the polymerization progresses and becomes equal to the polymerization temperature when the conversion reaches a level of from about 80 to 90%. Therefore, according to this invention the mixture is then heated to a temperature above 80° C. to complete the polymerization of remaining 10–20% of the monomers.

In general, since strain and bubbles in the polymeric product are formed at the stage when the conversion of the mixture is lower than 60%, normally, 30–50% wherein the gell effect on the rate of polymerization occurs, the heating for completion of polymerization after reaching the conversion to a level of 80–90% does not produce any strain in the polymeric cast product. Therefore, the completion of polymerization requires only an extremely short period of time and, thus, the total time for polymerization is shortened.

The compound (C) incorporated into the mixture is useful or acts as catalyst mainly at the polymerization completion stage.

The kinds of light useful in the polymerization according to this invention include strong natural light condensed, for example, through a condensing lense, visible and ultraviolet light from a high pressure or low pressure mercury lamp, laser, strong light from photon-factory, luminescence such as fluorescence or phosphorescence and the like. On the other hand, the ionizing radiation which may be used for the polymerization according to this invention includes any radiation which ionizes substances, such as alpha-rays, beta-rays, gamma-rays, X-rays, electron beams and mixed rays from a nuclear reactor or a fission product. The dose and the dose rate should be determined based on the other conditions for polymerization and the composition of the polymerizable mixture, but are usually in the range of from $10^2$ to $10^9$ roentgens/hrs and in the range of from $10^4$ to $10^7$ roentgens, respectively.

The polymerization is usually carried out at a temperature lower than 30° C., preferably below 0° C., and most preferably below −30° C. For completion of the polymerization, the mixture is heated to a temperature higher than 80° C., and may be heated above 100° C. However, the temperature should not be above the decomposition temperature of a polymer to be produced, usually, about 120 or 130° C.

The molds, cells and the like which to be used for the cast polymerization according to this invention are selected to their shape and material, depending on the specific shape of a cast product to be prepared, such as plate, lens, mask, cylinder column, sphere or the like. The material for the cell or mold includes glass, metal or the like.

This invention is further illustrated by the following Examples wherein all "parts" and percentages are based on weight unless otherwise indicated.

EXAMPLE 1

Diethyleneglycol-bis-allylcarbonate (30 parts), diethyleneglycol diacrylate (70 parts) and diisopropyl peroxydicarbonate (0.5 parts) were mixed and the mixture was poured into a glass cell by which a sample 60 mm × 60 mm square × 10 mm thick can be formed, cooled to −50° C. and irradiated with light having maximum energy at 3,600 Å from a high pressure mercury arc lamp positioned 10 cm away for 3 hours to form a transparent shaped polymer without strain or bubbles at a 90% conversion. The resulting mass was then heated as it is at 150° C. for 30 minutes to realize 100% conversion.

In case the mixture above is polymerized by heating without irradiation by light, heating to a temperature higher than 45° C. is necessary for polymerization but a polymer free from strain could not be obtained even by the use of the catalyst in the above-defined amount. The use of the catalyst in an amount of 0.05% and the reaction time of 60 hours realized the production of a shaped polymer free from strain at a 91% conversion. On the other hand, in case only diethyleneglycol bis-allylcarbonate is used as a single monomer, the polymer thereof free from strain could be obtained only when the polymerization was carried out at a temperature of 45° C. for 48 hours by the use of the above identified catalyst in an amount of 0.1% by weight.

The polymer which was polymerized at −50° C. had 25.2% of Haze Value (ASTM, D-1003-61) as wear property after the Sand Falling test (ASTM, D=673-44), an improved solvent resistance against almost all solvents and resistance to heat such that it is not deformed by heat even at 250° C.

EXAMPLE 2

Diethyleneglycol-bis-allylcarbonate (70 parts), tetraethyleneglycol diacrylate (30 parts), diisopropyl peroxydicarbonate (0.5 parts) were mixed and the mixture was poured into a mold to prepare a refractive lens, cooled to −78° C. and irradiated with gamma rays from Co-60 at a dose rate of 2 × $10^6$ roentgen/hr for 1 hour to obtain a cast polymeric lens free from any strain or bubbles therein at a 82% conversion. The conversion was determined by measuring refraction of a polymer piece. The lens was then heated at 120° C. for another 40 minutes to obtain 100% conversion.

In case the mixture above is polymerized by heating without irradiation by gamma rays, heating to a temperature above 45° C. was required. Further, a cast polymer free from strain could not be produced by the use of the catalyst in that amount, but could be prepared only when the polymerization was carried out by the use of the catalyst in an amount of 0.1 part for 54 hours.

The resulting copolymer was insoluble in almost all kinds of solvent, had a 24.6% Haze value after the Sand-Falling test, was sufficiently good at 250° C. and consequently, was found to have properties comparative or superior to those of the homopolymer of diethyleneglycol-bis-allylcarbonate.

EXAMPLE 3

Diethyleneglycol-bis-allylcarbonate (50 parts), 1,3-butanediol diacrylate (50 parts) and benzoyl peroxide (1.0 part) were mixed and the mixture was poured into a metal mold having a bore of 5 cm inner diameter in order to form a cast polymeric cylinder, irradiated with $\gamma$-rays from Co-60 at a dose rate of $2 \times 10^5$ roentgen/hour for 3 hours while maintaining the temperature at $-30°$ C. After termination of the irradiation, the mixture was heated to 90° C. for 1 hour to complete the polymerization thereby obtaining a transparent polymeric cast product without any defect such as strain or bubbles. It was found that the cast polymeric product can be used, for example, as a lens for glasses by cutting the product out to form a plate with a desirable thickness and processing it with grinder to provide it with a predetermined curvature. The properties such as wear property, resistance to solvents, heat and the like were found to be similar to those of the homopolymer of diethyleneglycol-bis-allylcarbonate. It was found that the impact resistance is such that it receives no damage when a steel ball weighing 40 g is dropped onto the surface of the product from a height of 130 cm, and its weather resistance is such that its various properties do not essentially change even after subjecting it to an accelerated weathering test for 500 hours by the use of a xenon-lamp weather meter.

EXAMPLE 4

Diethyleneglycol-bis-allylcarbonate (60 parts), hexanediol dimethacrylate (40 parts), methyl methacrylate (40 parts) and diisopropyl peroxydicarbonate (1.0 part) were mixed and the mixture was poured into a glass mold in prism having a triangular cross-section of 60° each of the angles formed with each adjacent bases. The mixture was then irradiated with visible and ultraviolet light having maximum energy at 3,600 Å from a high pressure mercury arc lamp positioned 15 cm away from the mixture at 0° C. for 5 hours, and after termination of the irradiation, heated at 90° C. for 50 minutes to obtain a cast polymeric product without strain.

It was found that if the above-identified mixture is formed into a cast polymeric product without irradiation by light, the object product can be obtained only when the polymerization is carried out for 67 hours by adding diisopropylperoxy dicarbonate, as the catalyst in an amount of 0.1 part.

It was found that copolymer obtained had improved wear property, resistance to heat, solvents and impact in comparison with the homopolymer of diethyleneglycol-bis-allylcarbonate by measuring physical properties of the copolymeric plate and prism. It was also found that by the addition of methyl methacrylate, the reducing of transmittance of the product after the weathering test disappeared.

EXAMPLE 5

Diisopropyl peroxydicarbonate (0.5 parts) was added to a mixture of diethyleneglycol-bis-allylcarbonate (70 parts), glycidyl methacrylate (30 parts), tetraethyleneglycol diacrylate (30 parts) and styrene (20 parts). The mixture was poured into a glass cell 40 cm × 40 cm square and 15 mm depth and irradiated with gamma rays from Co-60 at a dose rate of $2 \times 10^5$ roentgen/hour at room temperature for 3 hours and then heated at 100° C. for 50 minutes to form a cast polymeric product free from strain and bubbles.

When the mixture above was polymerized without irradiation, a cast polymeric product could be obtained only when the polymerization was carried out by decreasing the amount of diisopropylperoxy dicarbonate used as the catalyst to 0.08 parts at a temperature above 45° C. for at least 79 hours.

It was found that the copolymer obtained according to this Example had better durability, resistance to heat, solvents, impact, and the like than the homopolymer of diethyleneglycol-bis-allylcarbonate. It was found that the addition of styrene improved the fabricability of the product when the product was subjected to cutting and grinding to provide it with curvature.

EXAMPLE 6

Triethylene glycol-bis-allylcarbonate (60 parts), tetraethyleneglycol dimethacrylate (40 parts), diisopropyl peroxydicarbonate (1.0 part) were mixed. The mixture was poured into a glass cell, cooled to $-78°$ C. and irradiated with gamma rays from Cs-137 at a dose rate of $5 \times 10^5$ roentgen/hr at that temperature for 2 hours to obtain a polymeric product completely free from strain and bubbles at 88% conversion. The resulting product thus obtained was further heated at 120° C. for 30 minutes to obtain a cast polymeric product without any defect with 100% conversion.

When the mixture was polymerized by heating without irradiation, heating to a temperature above 45° C. was required to obtain a copolymer but a cast polymeric product free from strain could not be formed with such an amount of the catalyst as specified above. A cast polymeric product without strain could be obtained only when the polymerization was carried out at a temperature above 45° C. for about 67 hours by the use of the catalyst in an amount of 0.05%. On the other hand, the homopolymer of triethylene-bis-allylcarbonate could not be obtained even by the irradiation under the conditions above. Further, strain-free homopolymer could be obtained only when the polymerization was conducted at 45° C., for 52 hours by the use of the catalyst in an amount of 0.10 parts.

The copolymeric product obtained in this Example had a wear property of 27.1% as Haze value after the Sand-Falling test, received no significant damage from most solvents and exhibited no deformation when used at 250° C.

EXAMPLE 7

Propyleneglycol-bis-allylcarbonate (80 parts), diethyleneglycol diacrylate (20 parts), and dibutyl peroxydicarbonate (1.0 part) were mixed and the mixture was poured into a mold for Fresnel's lens, cooled to $-63°$ C. and irradiated with $\gamma$-ray from Cs-137 at a dose rate of $3 \times 10^5$ roentgen/hour for 4 hours to obtain a polymeric product without any defect such as strain or bubbles at a 90% conversion.

In case the mixture above was polymerized by heating without irradiation, the heating to a temperature above 45° C. was required. However, a cast polymeric product without strain could not be obtained with the amount of catalyst specified above, but could be produced only when the polymerization was carried out for about 59 hours with the addition of the catalyst in an amount of 0.05%. A homopolymer of propyleneglycol-bis-allylcarbonate could not be obtained under the conditions as set forth in this example, but was obtainable only when the polymerization was conducted at 45° C. for 50 hours with the use of the catalyst in an amount of 0.10%.

It was found that the copolymeric product obtained in this Example had a wear property of 24.4% as Haze value after the Sand-Falling test, was insoluble in almost all solvents and the product was caused no significant deformation even when used at a temperature of 250° C.

What is claimed is:

1. A process for efficiently producing a transparent shaped polymeric product, free from defects such as bubbles and strain, of sufficiently high mechanical strength, surface hardness, weather resistance, and impact resistance to serve as a substitute for inorganic glass, consisting essentially of the steps of: mixing (A) one or more compounds represented by the formula

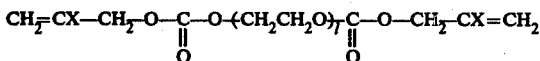

or

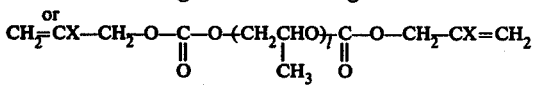

wherein X is H or CH$_3$ and l is an integer of from 1 to 4, or a prepolymer thereof, in an amount of from 30 to 80% by weight, (B) one or more compounds represented by the formula

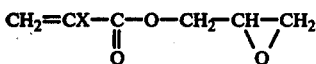

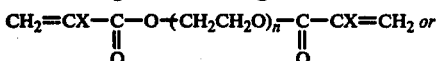

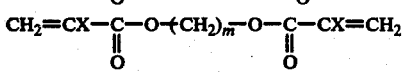

wherein X is H or CH$_3$, n is an integer of 2, 3 or 4 and m is an integer of from 3 to 6, or a prepolymer thereof, in an amount of from 70 to 20% by weight based on the total amount of (A) and (B), and (C) a radical polymerization catalyst in an amount of from 0.5 to 5 parts by weight per 100 parts of the total amount of (A) and (B);

pouring the mixture into a cell or mold adapted to cast polymerization;

irradiating it with light of ionizing radiation at a temperature below room temperature to subject it to cast polymerization; and then heating it to a temperature ranging from 80° C. to the decomposition temperature of the copolymer to be produced to complete the polymerization.

2. A process according to claim 1 wherein the component (A) is a compound represented by the formula

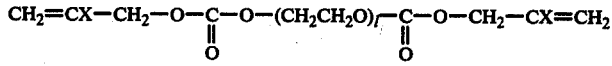

wherein X is H or CH$_3$ and l is an integer of 1,2 or 3.

3. A process according to claim 1 wherein the component (A) is diethyleneglycol-bis-allylcarbonate or diethyleneglycol-bis-methallylcarbonate.

4. A process according to claim 1 wherein the component (B) is a compound represented by the formula

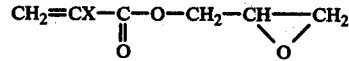

wherein X is H or CH$_3$.

5. A process according to claim 1 wherein said temperature during irradiation is below −30° C.

6. A process according to claim 1 wherein said ionizing radiation is gamma rays or electron beams.

7. A process according to claim 1 wherein said irradiation of ionizing radiation is carried out at a dose rate of from 10$^2$ to 10$^9$ roentgen/hr and with a total dose of from 10$^4$ to 10$^7$ roentgen.

8. A process according to claim 1 wherein a monomer copolymerizable with said components (A) and (B) is mixed with said components (A) and (B) in an amount less than 40% by weight based on the total amount of the components (A) and (B) and this monomer.

9. A process according to claim 8 wherein said monomer is a lower alkyl acrylate or methacrylate.

10. A process according to claim 1 wherein said temperature during irradiation is below 0° C.

* * * * *